2,976,264
COMPOSITIONS OF MATTER AND METHODS AND STEPS FOR MAKING AND USING THE SAME

Mortimer T. Harvey, South Orange, and Peter L. Rosamilia, Newark, N.J., assignors to Harvel Research Corporation, a corporation of New Jersey No Drawing. Filed Aug. 29, 1957, Ser. No. 680,923

2 Claims. (Cl. 260—73)

This invention relates to novel compositions of matter and to methods for producing them. More particularly, the invention is directed to novel compositions comprising material (II) one or a combination of two or more butadiene-furfural organic reaction products combined with various materials (I) styrene and/or polystyrene in the presence or absence of a catalyst. In one of its specific aspects the invention is directed to such combinations in which materials (I) and (II) are concurrently and simultaneously polymerized or copolymerized to provide novel and useful products finding application in a number of different fields. The butadiene-furfural organic products employed in the practice of this invention are such materials (II) having softening points (ball and ring) no greater than 200° F. Throughout the present description and claims the term butadiene is and shall mean the compound butadiene 1,3. The polystyrenes employed are polymerized styrene which may be liquid or solid and in any case have softening points (ball and ring) no greater than 150° C.

Prior to this invention, butadiene was reacted with furfural under varying conditions to provide a wide variety of compositions, all of which contained material (II).

Among some of said materials (II) which may be employed as starting materials in the practice of this invention are (IIA) substantially pure 2,3,4,5-bis($\Delta^2$-butenylene)-tetrahydrofurfural, as well as homopolymers thereof, and other compositions in which said compound and/or its polymers is present as a component in varying degrees of concentration and together with other organic compounds produced with furfural and/or butadiene under the particular reaction conditions employed.

Other materials (II) which may be employed in the practice of this invention are those disclosed in a number of issued patents known to the art and made part hereof. Among them are (IIB) light colored, liquid organic reaction products of furfural and butadiene having an average molecular weight of about 210, fractions thereof having boiling points in the temperature range of 200–320° F. at an absolute pressure of 1 mm. of mercury pressure. Such reaction products and methods for producing them are disclosed in the U.S. patent to Herbolsheimer 2,483,903, issued on October 4, 1945.

Still other examples of such materials (II) are (IIC) the tarry by-products or residues obtained by Herbolsheimer in practising the method disclosed in said patent.

Still other examples of said materials (II) are (IID) the dark colored tarry residues obtained in the reaction of furfural and butadiene and varying in consistency from practically solid, semi-solid to fairly fluid light colored liquid masses. Such masses are composed chiefly of complex mixtures of reaction products of butadiene and furfural in various molecular proportions generally 1:1 and/or 2:1 and with a substantial part being in polymeric form, and also (IID) which either under atmospheric pressure or subatmospheric pressure, which may be as low as 5 mm. of mercury pressure and generally 5–125 mm. of mercury pressure, is heated to and maintained at a temperature in the range of 250–450° F. either in the presence or absence of an alkaline or acidic catalyst until the quantity by weight thereof measures at least 60% of that of the original mass of (IID) and the average molecular weight thereof is at least 660 and its viscosity at 25° C. is such that a solution of 5 parts thereof in 10 parts of furfural has a viscosity at least 4 times that of a solution consisting of 5 parts of (IID) in 10 parts of furfural and has a softening point (ball and ring) no greater than 180° F. Such end products are known herein as (IIE) and in general may be characterized as homopolymerized (IID).

Still other examples of materials (II) are (IIF), the dark colored tarry residues which may vary in consistency from dark practically solid, semi-solid to fairly fluid lighter colored liquid masses which are complex mixtures of reaction products of butadiene and furfural and are by-products formed during the extractive distillation of a $C_4$ hydrocarbon mixture containing butadiene, employing furfural as the selective solvent and are generally known to the art as residues formed in the furfural extractive distillation method for the purification of butadiene. (A report on such residues, which the authors term "polymeric residue formed in the furfural extractive distillation method for the purification of butadiene" appears in an article entitled "Butadiene-Furfural Copolymers" by Hillyer et al., Ind. and Eng. Chem., vol. 40, November 1948, pp. 2216–2220, reference to which is hereby made.)

Still other examples of materials (II) are (IIG) which are the materials produced by homopolymerizing (IIF) using the same methods as those set forth for the homopolymerization of (IID) to obtain (IIE).

The materials (II) preferably employed in the practice of this invention are (IIC)—(IIG) some of which are liquid and others solid at 70° F. but all of which have average molecular weight of at least 330, viscosity at 25° C. of at least 2000 cp., are soluble in furfural, and have a softening point (ball and ring) of at least 60° F. and no greater than 180° F.

In general, the amount of alkaline agent employed in order to effect the homopolymerization is such that it is sufficient to increase the pH of the mass to be polymerized to a value of at least 8, but may be as high as desired, depending upon the speed of reaction required. In factory practice, we prefer to carry out said polymerization at a pH in the range of approximately 8 to approximately 12 although higher pH conditions, as high as 13.5 may be employed. (The method for measuring pH wherever it occurs throughout the present description is to place 10 grams of the materials whose pH is to be determined in 100 grams of distilled water, heat the mixture to boiling while stirring, allow to cool to room temperature and take the pH by means of pH papers. The pH papers employed were those known as "Hydrion" by Micro Essential Laboratories of Brooklyn, N.Y.) Said pH conditions in the range of approximately 8–13.5 are established at the beginning and reduced in the course of polymerization. Among some of the alkaline agents which may be employed in the practice of this invention are sodium hydroxide, potassium hydroxide, calcium hydroxide, etc., diethylene triamine, triethylene tetramine, ethanolamine, propylene diamine, 1,6-hexamethylene diamine, tetraethylene pentamine, etc.

When acidic agent is employed for homopolymerization, there is used an acidic agent in amount equal to the acidic polymerizable equivalent of at least one part by weight of sulfuric acid for each 200 parts of the materials (II) to be polymerized. The quantity and nature of the acidic agent employed is such that the pH of a mixture of the acidic agent and material (II) to be polymerized is lowered to a value no greater than approximately 3.5, but may be as low as desired, depending upon the speed of reaction required. In factory practice, said polymerization is carried out at a pH in the range of 1.5 to approximately 3.5. Among some of the acidic agents which may be employed for effecting said polymerization are sulfuric acid, hydrochloric acid, phosphoric acid, fluoroboric acid, boron trifluoride, paratoluene sulfonic acid, alkyl sulfates such as the mono- and dialkyl sulfates, mono- or di- methyl, ethyl, propyl, etc. sulfates, phosphates, etc.

While various methods for producing materials (II) may be employed, we shall set forth herein a number of illustrative examples which shall be sufficient for illustrating said materials (II) which are employed as starting materials in the practice of this invention. The following Examples A–H are given by way of illustration and not limitation of such materials (II) and methods for producing them, all parts being given by weight unless otherwise specified.

EXAMPLE A

There is collected and obtained a batch of what is termed the "polymeric residue formed in the furfural extractive distillation method for the purification of butadiene." This raw residue which is a waste product or a by-product, generally is physically combined with water and therefore the batch is first placed in an oven and maintained at elevated temperature for about 15 hours for substantially complete dehydration and the resultant substantially dehydrated mass is hereinafter known as material (II)K–A. The dehydration may be effected at atmospheric pressure and at temperature of approximately 200–220° F.

EXAMPLE B

If desired, said original raw residue of Example A may be heated under either atmospheric or reduced pressure conditions to substantially completely dehydrate the mass at temperatures in the range of about 200–450° F. When the higher temperatures in said range are employed, furfural-butadiene reaction products come off as a distillate and are collected and are hereinafter known as materials (II)K–B, leaving behind residual mass which is substantially completely dehydrated and having had said fraction removed at least in part therefrom, with said residual mass measuring at least 60% by weight of said dehydrated residue. Such dehydrated residual masses are also obtainable from said raw residue when said residue is maintained at the higher temperature of said range while under subatmospheric pressure of 5–125 mm. of mercury pressure. Said dehydrated residues, as well as said distillates and the residual masses of said residues in all cases have a molecular weight of at least 330, a viscosity of at least 2,000 cp. at 25° C., a softening point (ball and ring) of at least 60° F. and no greater than 180° F. and are soluble in furfural.

EXAMPLE C

Into an oven maintained at 260–280° F. was placed a steel drum containing 485 lbs. of raw residue obtained from a Texas plant of the Phillips Petroleum Co. of Bartlesville, Okla., and being a residue obtained as a by-product in the purification of butadiene in which the furfural extractive distillation method was employed by that company. Said residue is allowed to stand in that oven for a period of about 15–18 hours whereupon the residue was substantially completely dehydrated and somewhat higher volatiles originally contained therein had been driven off. At the end of that period the mass in the container was still fluid at room temperature and is hereinafter known as material (II)K–C.

EXAMPLE D

Into a closed vessel is charged 500 lbs. of raw residue obtained from the Sinclair Rubber Inc. of Texas, said residue being that obtained as a by-product in the purification of butadiene in which the furfural extractive distillation method was employed by that company. While under a vacuum of about 28" of mercury, the temperature of the raw residue is elevated slowly over about 1 hour period until it reached 215° F. and then the source of heat was removed and the vacuum broken. The resultant dehydrated mass is thick, but pourable at room temperature and is hereinafter known as material (II)K–D. In the course of heating, said raw residue under such subatmospheric conditions, a distillate was recovered and consisted mainly of water with a small amount of light volatiles. If desired, while under the same degree of vacuum, the mass may be further heated and maintained at a temperature of 325–350° F. whereupon more volatiles come off and the remainder is so thick or polymerized that a sample thereof when cooled to room temperature has a softening point (ball and ring) of 130–180° F., depending upon the time of heating, and such product is known herein as material (II)K–DI.

EXAMPLE E 800 lbs. of raw residue obtained from a Texas plant of the Phillips Petroleum Co. of Bartlesville, Okla. was another illustrative raw material used. The raw residue was the water-laden residue obtained as a by-product or waste product in the purification of butadiene in which the furfural extractive distillation method was employed by that company. This particular residue was quite heavy and a layer of water had separated out and floated on top of the residue. Most of the water layer was dipped off. Then the residue which still contained an appreciable quantity of water, was transferred to a kettle, there was added an aqueous solution consisting of 8 lbs. of sodium hydroxide in 8 lbs. of water and the mass was agitated to distribute the sodium hydroxide throughout the residue. Then the mass was heated to a temperature of approximately 320–340° F. and maintained at that temperature while under subatmospheric conditions and a pressure of approximately 5–125 mm. of mercury pressure to substantially completely dehydrate the residue and to polymerize it to a softening point (ball and ring) of 165° F. This polymerized product so produced is solid at room temperature, but at 180° F. is liquid, that is, it will flow and such polymerized product is hereinafter known as material (II)K–E.

EXAMPLE F

Into an oven maintained at 260–280° F. was placed a steel drum containing 485 lbs. of raw residue obtained from a Texas plant of the Phillips Petroleum Company of Bartlesville, Okla., and being a residue obtained as a by-product in the purification of butadiene in which the furfural extractive distillation method was employed by that company. Said residue is allowed to stand in that oven at that temperature for a period of about 15–18 hours whereupon said residue was completely dehydrated and some of the higher volatiles originally contained therein had been driven off. At the end of that period the mass in the container was a dark, thick, yet fluid mass. This product is hereinafter known as material (II)K–F. The entire mass may be transferred to a closed kettle, vented to the atmosphere through which distillates may pass and be collected, and heated to approximately 425° F. and maintained at that temperature for approximately 2 to 5 hours. Then the source of heat may be removed and the resultant mass poured into pans and allowed to cool to room temperature. At this temperature the mass will be a thermoplastic solid, insoluble in hot and cold V.M.P. naphtha and will have a softening point (ball and ring) of 170° F. and consists chiefly of a highly polmerized reaction mass. This product is hereinafter known as material (II)K–F1. All distillates are collected and combined and they dehydrated at 220° F. while under 28" vacuum. The dehydrated combined distillates are known herein as materials (II)K–F2. To the combined distillates either dehydrated or not and preferably the dehydrated mass has added thereto a solution consisting of 33 parts by weight of potassium hydroxide in 66 parts by weight of water. The quantity of said solution added is equal to 10 parts thereof to 100 parts of said distillate on a dry basis. The mass is mixed together and heated up to and maintained at 300° F. while being stirred and under such conditions after 13–14 hours is polymerized to such a degree that when cooled to room temperature it is a thermoplastic solid having a softening point (ball and ring) of approximately 180° F. and this product is known hereinafter as material (II)K–F3.

To 100 lbs. of material (II)K–F were mixed 6 lbs. of an aqueous solution consisting of 2 lbs. of sodium hydroxide in 4 lbs. of water. The mix was heated to and maintained at approximately 300° F. under atmospheric conditions until a solution of a 10-gram sample thereof at 25° C. dissolved in 5 grams of furfural had a viscosity at 25° C. about 4 times that of a solution of a 10-gram sample of the original material (II)K–F dissolved in 5 grams of furfural. At this stage the mass is quickly cooled and there is added thereto an agent to neutralize the alkaline catalyst, if desired, and the polymerized product is hereinafter known as material (II)K–F4.

EXAMPLE G

To the combined distillates material (II)K–F2, either dehydrated or not and preferably in dehydrated condition, may be added about 10 parts of a 45% aqueous soltuion of fluoboric acid for each 100 parts of said dehydrated distillate. The mass is mixed together and maintained at 350° F. and under such conditions, until the viscosity of the mass at 25° C. was 20,000 cp. and this product is known hereinafter as material (II)K–G.

To 100 lbs. of material (II)K–F were mixed 15 lbs. of concentrated aqueous hydrochloric acid. The mix was heated to and maintained at approximately 290° F. until a solution of a 10-gram sample thereof at 25° C. dissolved in 5 grams of furfural had a viscosity at 25° C. about 2 times that of a solution of a 10-gram sample of the original material (II)K–F dissolved in 5 grams of furfural. At this stage the mass is quickly cooled and there is added thereto an agent to neutralize the acidic catalyst and the polymerized product is hereinafter known as material (II)K–G1.

EXAMPLE H

Into a closed vessel is charged approximately 500 lbs. of raw residue obtained from the Sinclair Rubber Inc. of Texas. Said residue being that obtained as a by-product in the purification of butadiene in which the furfural extractive distillation method is employed by that company. While under a vacuum of about 28″ of mercury, the temperature of the raw residue is elevated slowly over about 1 hour period until it reaches approximately 215° F., then the source of heat is removed and the vacuum is broken. The resultant mass weighs approximately 375 lbs., is thick but pourable, has a molecular weight above 330, a viscosity about 2,000 cp. at 25° C. and is soluble in furfural and has a softening point (ball and ring) above 60° F. The material which distilled over during the course of that heat treatment under vacuum was collected and consisted mainly of water together with a small amount of light volatiles. This product, said 375 lb. mass, is hereinafter known as material (II)K–H.

If desired, while under the same degree of vacuum, the mass may be further heated and maintained at a temperature of 325–350° F. whereupon more distillate comes off, the distillate collected and the remainder is so thickened or polymerized that a sample thereof when cooled to room temperature has a softening point (ball and ring) of 130–180° F. At that stage the mass is cooled to room temperature and will be found to be a thermoplastic and substantially solid resinous mass soluble in furfural and hereinafter known as material (II)K–H1. The distillates were combined and are known as material (II)K–H2.

To 100 parts of said material (II)K–H2 calculated on a dry basis and being either in combination with the water or dehydrated, was added 8 parts of diethyl sulphate. The mix was heated to and maintained at 280° F. until a sample thereof had a viscosity at 25° C. approximately 10 times that of the original material (II)K–H2 in dehydrated state, and this thickened or polymerized product is hereinafter known as material (II)K–H3, is soluble in furfural and is in the liquid state.

To 100 parts of product (II)K–H is added 2 lbs. of an aqueous solution consisting of 1 lb. of sulfuric acid in an equal quantity of water. The mix is heated to and maintained at 325° F. until the viscosity at 25° C. of a 10-gram sample thereof in 5 grams of furfural is two times that of a solution of a 10-gram sample of the original material (II)K–H in 5 grams of furfural. Then the acidic agent is neutralized and cooled to room temperature. The so-thickened or polymerized mass is soluble in furfural and is liquid at 180° F. and is known as material (II)K–H4.

In the course of our experimentations with materials (II), some examples of which are material (IIA)—(IIG), we have discovered that materials (II) are compatible with materials (I), and that such combinations find application in a number of different and unrelated fields. We have further discovered that materials (I) and materials (II) when in combination, in the presence or absence of a copolymerizing catalyst such as, for example, benzoyl peroxide, tertiary butyl peroxide, potassum persulphate, etc., are capable of simultaneous and concurrent polymerization or copolymerization. In general, the ratio by weight of materials (II) to materials (I) is generally in the range of 100 parts of materials (II) to 20–800 parts of material (I). The various novel compositions of this invention have various characteristics and therefore find different applications. Some of them may be used alone as coating materials, or for that purpose may be combined with other coating materials, such as phenol-formaldehyde resins, alkyd resins, oil modified alkyd resins, and various oleoresinous combinations, with the base to be coated, for example, being paper, pressboard, woven and nonwoven fabrics, metals, etc., and such coatings have high caustic resistance and also are moisture and oil resistant; others find greater utility when compounded with material (III), one or a combination of two or more rubbery materials selected from the group consisting of natural rubber, reclaimed rubber, homopolymers of butadiene, homopolymerized chloroprene ("neoprene"), copolymers of butadiene and styrene, copolymers of butadiene and acrylonitrile for imparting ozone resistance, heat ageing, tear strength and tensile strength thereto, with a ratio by weight being 2–100 parts of a product of this invention and particularly such products having a softening point (ball and ring) of 130–210° F. For each 100 parts of material (III); also products of this invention, and particularly those which may be either liquid or solid at 70° F. and having a softening point (ball and ring) no greater than 210° F. may be combined with material (IV) one or a combination of two or more normally solid resins selected from the group consisting of polyvinyl chloride, polyvinyl acetate, polyvinyl butyral, polyvinyl formal, polyvinyl acetal, and copolymers of vinyl acetate and vinyl chloride, with the ratio by weight varying over a wide range, depending upon the characteristics desired in the end product, and which in general is 100 parts of product (IV) to 2–100 of such novel product, depending upon the particular novel product employed and the characteristics desired in the end product, and some of which combinations, and especially those which are gels or in the nature of gels which may be either soft or stiff and in any case those which are normally solid and have a softening point (ball and ring) no greater than 210° F. may be compounded with material (III), with a ratio by weight of gel to material (III) being 5–100 of the former to 100 parts of the latter; these novel products may be combined with or without fillers and with materials (IV) and/or material (III) to provide compositions which are hot-extrudable for the production of ribbons which, in turn, may be cut to any desired lengths and then cooled to room temperature to provide floor coverings or tile floor coverings.

The following are some examples of this invention and are given by way of illustration and not limitation, all parts being given by weight unless otherwise specified.

*Example 1*

150 grams of product (II)K–A and 150 grams of monomeric styrene were mixed together in a glass reaction vessel provided with a stirrer and connected to a reflux condenser. External heat was applied thereto, whereupon the temperature thereof was elevated to such a degree that vigorous refluxing occurred and the mass was maintained under such conditions for a period of about 6 hours. The source of heat was removed and the mass was cooled to room temperature and was found to have a viscosity of approximately 3,000 cp. at 25° C., and is hereinafter known as product 1. Product 1 was applied as a thin film on a paper base and such coated base was cut into two parts. One part was placed in an oven maintained at 120° F. and was allowed to remain therein for 6 hours, after which it was removed and was found to have high caustic resistance, moisture resistance and oil proofness characteristics. The other sample was allowed to remain at room temperature for 24 hours and was then tested and was also found to have high caustic, moisture and oil resistance.

*Example 2*

100 grams of 2,3,4,5-bis($\Delta^2$ butenylene)-tetrahydrofurfural and 200 grams of monomeric styrene were mixed together in a glass vessel equipped with a stirrer and connected to a reflux condenser. The mass was continuously stirred while being externally heated until vigorous refluxing occurred and this condition was maintained for a period of approximately 12 hours. The resultant mass at 25° C. had a viscosity considerably greater than that of the original mix at that temperature and is known herein as product 2. Product 2 finds substantially the same application as product 1, and also, like product 1, may be combined with phenol-formaldehyde resins, alkyd resins, oil modified alkyl resins and oleoresinous combinations which also may be used as coating materials.

*Example 3*

150 grams of product (II)K–D1 and 150 grams of polystyrene (Dow Chemical Co. "Styron A–558") were heated together to a temperature of approximately 150° C. for solution which was subsequently cooled and was found to be a flexible, rubbery mass, hereinafter known as product 3, which finds application as a binder in floor coverings and as a component for combination with materials (III) and/or (IV).

*Example 4*

100 grams of product 1, 200 grams of polystyrene (Dow Chemical Co. "Styron A–558") were heated together to a temperature of about 150° C. for solution and the resultant product, hereinafter known as product 4, finds particular application as a binder in the manufacture of floor tiles and floor coverings.

*Example 5*

200 grams of material (II)K–E and 50 grams of product 1 were heated together until solution took place. This combination, hereinafter known as product 5, finds particular application as an additive for rubber, for imparting ozone resistance, tear strength, etc. thereto.

*Example 6*

150 grams of product (II)K–C, 150 grams of monomeric styrene and 3 grams of benzoyl peroxide were charged into a glass vessel having a stirrer therein and connected to a reflux condenser. External heat was applied thereto whereupon the temperature thereof was elevated to such a degree that vigorous refluxing occurred and the mass was maintained under such conditions until a sample thereof was a heavy viscous mass, at which time the mass in the vessel was cooled to provide product 6, which finds application as a coating material.

The following stocks may be prepared on a cool mill according to usual milling procedure and then cured for 30 minutes under pressure at 300° F. to provide vulcanizates of improved ozone resistance, greater tensile strength, greater resistance to petroleum solvents, greater tear strength and better heat ageing properties than vulcanizates produced from such stocks in which products of the present invention were omitted.

| Ingredients | A | B | C |
|---|---|---|---|
| GR-S X-478 (copolymer of styrene and butadiene) | 100 | 100 | 100 |
| Stearic acid | 1.5 | 1.5 | 1.5 |
| Zinc Oxide | 5 | 5 | 5 |
| EPC Black (Carbon black) | 50 | 50 | 50 |
| Product 3 | 15 | | |
| Product 4 | | 25 | |
| Product 5 | | | 40 |
| Phenyl-beta-naphthylamine | 1 | 1 | 1 |
| Sulfur | 2.45 | 2.75 | 3.2 |
| 2-Mercapto benzothiazole | 1.5 | 1.5 | 1.5 |
| Diphenyl guanidine | 0.2 | 0.2 | 0.2 |

Since certain changes in carrying out the aforesaid processes and certain modifications in the compositions which embody the invention may be made without departing from its scope, it is understood that all matter contained in the description shall be interpreted as illustrative and not in a limiting sense.

It is also to be understood that the following claims are intended to cover all the generic and specific features of the invention, which as a member of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

This application is a continuation-in-part of our copending application Serial No. 238,376 filed July 24, 1951.

Having thus described the invention, what we claim is:

1. A novel composition of matter comprising (II) organic material containing butadiene-furfural reaction product, said material having viscosity of at least 2000 centipoises at 25° C., softening point (ball and ring) no greater than 180° F. and selected from the group consisting of (a) residues obtained in the furfural extractive distillation method for the purification of butadiene, (b) residual fractions of (a), and polymers of (a) and (b) respectively, intimately combined with (I) styrene.

2. A novel composition of matter comprising (II) organic material containing butadiene-furfural reaction product, said material having viscosity of at least 2000 centipoises at 25° C., softening point (ball and ring) no greater than 180° F. and selected from the group consisting of (a) residues obtained in the furfural extractive distillation method for the purification of butadiene, (b) residual fractions of (a), and polymers of (a) and (b) respectively, intimately combined with (I) polystyrene, said polystyrene having a softening point (ball and ring) no greater than 150° C.

References Cited in the file of this patent
UNITED STATES PATENTS

| | | |
|---|---|---|
| 2,651,624 | Swart | Sept. 8, 1953 |
| 2,657,192 | Miller et al. | Oct. 27, 1953 |
| 2,683,151 | Hillyer | July 6, 1954 |